Aug. 25, 1964  L. B. EMERSON ETAL  3,146,440
INDICATING APPARATUS

Filed Nov. 27, 1959  2 Sheets-Sheet 1

INVENTORS
LEONARD B. EMERSON
RICHARD P. CURTIS
BY
ATTORNEY

Aug. 25, 1964     L. B. EMERSON ETAL     3,146,440
INDICATING APPARATUS

Filed Nov. 27, 1959     2 Sheets-Sheet 2

INVENTORS
LEONARD B. EMERSON
RICHARD P. CURTIS
BY *H. Vincent Harsha*
ATTORNEY

United States Patent Office 3,146,440
Patented Aug. 25, 1964

3,146,440
INDICATING APPARATUS
Leonard B. Emerson, Framingham, and Richard P. Curtis, Marblehead, Mass., assignors to Raytheon Company, Lexington, Mass., a corporation of Delaware
Filed Nov. 27, 1959, Ser. No. 855,606
1 Claim. (Cl. 340—373)

This invention relates generally to indicating apparatus and, more particularly, to means for providing a glare-free viewing window in said apparatus for use under bright illumination.

In indicating devices, such as clocks, speedometers, or other measuring apparatus which may be used in direct sunlight or in other brightly illuminated areas, undesirable reflections may occur at the viewing window regions of said apparatus. These reflections may cause the indexing means, such as pointer or flashing light indicator, to become indistinct or even to disappear from view altogether. Because of the glare which occurs, such apparatus may require a hood or other means for shading the apparatus to prevent any of the bright light rays from striking the window viewing areas and being reflected back to the viewer. Alternatively, the apparatus may be positioned in a shaded location which may be both inconvenient and undesirable for the particular application in which the apparatus is being used.

A particular example wherein the use of indicating instruments in direct sunlight is not always possible or convenient because of the glare involved occurs in depth sounding measurement apparatus used by boat owners to determine water depths. It is often necessary to place such instruments directly on the open deck of a boat or at other locations where the instrument is positioned in direct sunlight or in the path of sunlight reflected from the water or other surfaces. Because of the glare present at the viewing window and the subsequent unreadability of the instrument, the boatsman is prevented from obtaining full advantage of the apparatus. In many cases, the inability to read the instrument correctly may occur at a crucial moment during navigation and hamper safe control of the boat. Therefore, in the interests of safety and convenience, it is desirable to provide a glare-free viewing window in said indicating apparatus. Depth sounders and other measuring apparatus with practicable non-glare features have been unavailable up to the present time.

This invention provides an indicating apparatus having a viewing window which is substantially free of glare even when used under direct and very bright illumination, such as sunlight. In a preferred embodiment of the invention, the viewing region is constructed substantially in the form of a recessed window having a first portion of its surface made of a transparent material and having a second portion of its surface made of a non-reflective material oppositely disposed with respect to said first portion. In one preferred embodiment of the invention, the transparent portion is fabricated in a frusto-conical shape and the non-reflective portion is constructed in a substantially cylindrical shape. The surface of the transparent portion intersects the surface of the non-reflective portion so as to form an acute angle. Such a construction prevents light rays that impinge on the transparent window from being reflected back into the eyes of the viewer.

The description of the invention and the explanation of its operation may be more easily understood with the help of the drawing wherein.

Figure 1:
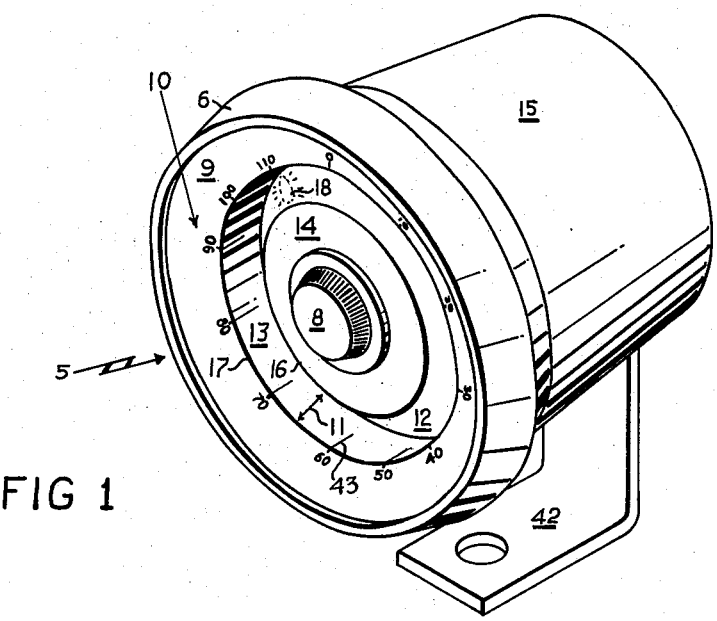
FIG. 1 shows a pictorial view of an indicating apparatus utilizing a particular embodiment of the invention.

In FIG. 1 there is shown a pictorial view of an indicating apparatus 5 used for measuring water depths and conventionally known as a depth sounder. Indicating apparatus 5 is provided with a case having a cover 15 which houses electronic and mechanical parts required in the operation of the instrument for the measurement of water depths. Such parts do not form a part of this invention and are, therefore, not described in detail in this application. At the front of apparauts 5 there is mounted a substantially annular panel member 6 having a scale 10 marked upon its inner surface 9. A circular face plate 14 having a centrally located control knob 8 is concentrically positioned within said annular panel member 6. Between outer perimeter 16 of face plate 14 and inner perimeter 17 of panel member 6 is a region 11 for viewing a rotatably mounted indexing means, such as a flashing light indicator 18. Flashing light indicator 18 represents a well-known type of indexing means for use in conventional depth sounders, or other similar measuring apparatus.

Viewing region 11 in this particular embodiment comprises a first surface 12 which is frusto-conical in shape and extends rearward from perimeter 16 of face plate 14 to the interior portion of viewing region 11. Surface 12 intersects a substantially cylindrical surface 13 which extends rearward from the inner perimeter of panel member 6 to the interior of viewing region 11. Surface 12 is made of a transparent material, such as glass, and acts as a viewing window behind which flashing light indicator 18 rotates. Cylindrical surface 13 is made of a non-reflective and light-absorbing material. As a particular example, surface 13 may be fabricated from a metal that is made substantially non-reflective by painting its surface a dull black color. A second set of scale markings 43 may be added to surface 13 corresponding in whole or in part to the scale 10 marked on surface 9, in order to overcome parallax difficulties. It has also been found helpful to paint the surface areas of face plate 14 and panel member 6 a dull black color to reduce the chances of annoying glare from these regions. Apparatus 5 may be mounted in any suitable position by means of a mounting bracket 42 attached to cover 15.

Figure 2:
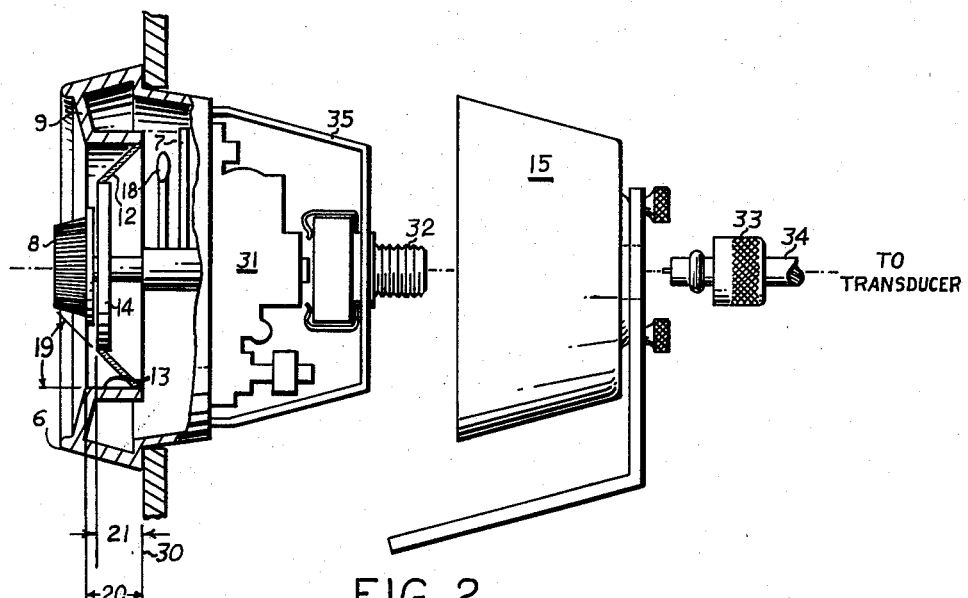
FIG. 2 shows a partially cross-sectional and partially schematic view of the indicating apparatus shown in FIG. 1.

The structure of the apparatus shown in FIG. 1 provides a glare-free viewing window area and is shown in FIG. 2 in a substantially sectional view with its cover 15 removed. In FIG. 2, it can be seen that the angle 19 formed by the intersection of transparent window surface 12 and dull black surface 13 is an acute angle and, in this particular embodiment, is equal to approximately 45°. For best viewing, it is generally recommended that the angle be at least 45° or more. It should be further noted, however, that, when angle 19 is equal to or greater than 45°, distance 20 from the outer edge of surface 13 to plane of intersection 30 should be greater than the distance 21 from the outer edge of surface 12 to plane of intersection 30. Thus, light-absorbing surface 13 projects slightly forward from transparent window surface 12. In general, as angle 19 is made greater than 45°, the ratio of distance 20 to distance 21 should also be made greater.

In order to increase the effectiveness of the glare-free operation, a light-absorbing member 7 may be placed behind flashing light indicator 18. The surface of member 7 is painted a dull black in a manner similar to surfaces 13 and 14 so that light from the flashing light indicator or ambient external light is not reflected from any surfaces within the interior of the apparatus.

FIG. 2 also shows the main body assembly 35 of apparatus 5 which is fixedly attached to front panel member 6 and upon which is mounted the necessary electronic and mechanical parts 31 shown in substantially schematic form in the figure. A bushing 32 is mounted at the rear of main body assembly 35. Cover 15 has an opening (not shown) at the rear through which bushing 32 is allowed to protrude. When the unit is assembled, cover 15 is positioned over main body assembly 35 and is held in place by a knurled nut 33 threaded on bushing 32. Knurled nut 33 also acts as a suitable connector for a cable 34 which is attached at its other end to a transducer (not shown). As can be seen from the figure, when knurled nut 33 is loosened, the complete body assembly 35 and front panel member 6 may be rotated within cover 15. Thus, no matter in what position cover 15 may be mounted, the front panel and body assembly may be correctly oriented so that the scale may be conveniently read in an upright position by the viewer.

Figure 3:
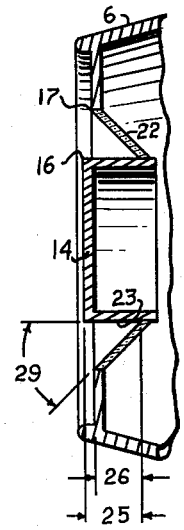
FIG. 3 shows a cross-sectional view of the front portion of an indicating apparatus utilizing another embodiment of the invention.

FIG. 3 shows another embodiment of the glare-free window system of the invention that may alternatively be used in the depth sounding apparatus of FIG. 1. In FIG. 3 a transparent window surface 22 is shown as a frusto-conical surface extending from inner perimeter 17 of front panel member 6 toward the interior of the apparatus. A cylindrically shaped, light-absorbing surface 23 extends from the outer perimeter of face plate 14 toward the interior of the apparatus and intersects window surface 22. Surfaces 22 and 23 thereby form an acute angle 29. In a manner similar to the embodiment shown in FIG. 2, it is recommended that the dimension 25 be greater than the dimension 26 so that surface 23 projects in a forward direction beyond surface 22.

Figure 4:
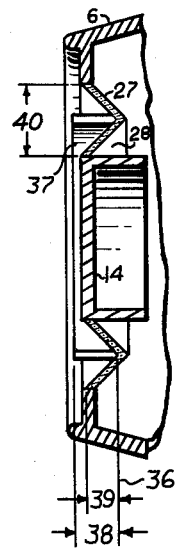
FIG. 4 shows a cross-sectional view of the front portion of an indicating apparatus utilizing a third embodiment of the invention.

FIG. 4 shows still another embodiment of the invention wherein there is shown a viewing region 40 having a first frusto-concial transparent window surface 27 extending inwardly from the inner perimeter of panel member 6 and a second frusto-conical transparent viewing window surface 28 extending inwardly from the outer perimeter of face plate 14. Transparent window surfaces 27 and 28 intersect at a plane indicated in the figure by solid line 36. Extending outwardly from plane 36 there is positioned a cylindrical fin 37 which substantially bisects the angle defined by surfaces 27 and 28. The surfaces of cylindrical fin 37 are made light absorbing by being painted a dull black. The distance 38 from the outer edge of fin 37 to plane 36 is greater than the distance 39 from the outer edges of window surfaces 27 and 28 to plane 36. Thus, as in FIGS. 2 and 3, the light-absorbing cylindrical fin extends outwardly from the front panel to a point beyond the transparent window surfaces.

Figure 5:
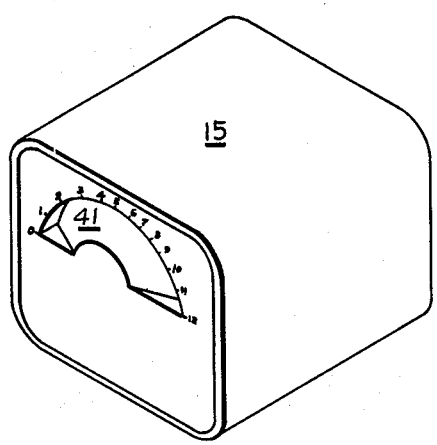
FIG. 5 shows the front panel of an instrument capable of using the embodiments shown in FIGS. 1–4 wherein only a portion of the circular viewing area is exposed to a viewer.

Although the embodiments described above and shown with reference to FIGS. 1–4 relate to circular viewing instruments reading radially from 0° to 360°, the structure of the invention is, of course, easily adaptable either to instruments having circular or semi-circular display areas wherein a portion or portions of the complete circular area may be covered or to instruments having rectangular shapes or other geometric configurations. As an example, FIG. 5 shows a front panel view wherein the viewer actually sees only that portion of a circular area which is exposed in the arcuate viewing window 41.

Because of the presence of parallax, inaccuracies in reading the instrument often occur. To overcome this difficulty, a second scale corresponding in whole or in part to the scale marked on the surface of the front panel members may also be marked upon the cylindrical light-absorbing surfaces of the invention. This second scale is reflected upon the transparent window surfaces and reduces the chances for errors in reading due to parallax. The additional scale markers provide a more accurate reading without changing the glare-free properties of the viewing window regions.

The viewing window need not necessarily be fabricated in the shape of wedge-shaped grooves as shown in the figures but may take other forms that may occur to those skilled in the art. It is desirable that the transparent surface be constructed so that no light impinging on its surface is reflected directly back to the viewer. Any light that is reflected from the transparent surface should be directed toward the light-absorbing surface, the latter being oppositely disposed with respect to the transparent surface for that purpose.

It is obvious that the particular embodiment shown and described herein is applicable to instruments other than depth sounders, such as clocks, speedometers, voltmeters, or other measuring or indicating instruments. The particular embodiments shown do not necessarily represent all the embodiments possible as other variations will occur to those skilled in the art within the scope of the invention. Hence, the invention is not to be construed as limited to those shown and described herein except as defined by the appended claim.

What is claimed is:

An indicating apparatus comprising a case; a substantially annular panel member mounted at the front of said case; a circular face plate mounted at the front of said case; a viewing window positioned between said face plate and said panel member, said viewing window comprising a transparent frusto-conical surface extending inwardly from the outer perimeter of said face plate, a substantially cylindrical light-absorbing surface extending inwardly from the inner perimeter of said panel member and intersecting said frusto-conical surface, said frusto-conical surface and said cylindrical surface forming an acute angle; a movable flashing light indicator rotatably mounted behind said transparent surface; a light-absorbing material mounted behind said movable flashing light indicator.

References Cited in the file of this patent

UNITED STATES PATENTS

| 1,335,330 | Goings | Mar. 30, 1920 |
| 1,972,889 | Hayes | Sept. 11, 1934 |
| 2,422,157 | Wolff | June 10, 1947 |
| 2,538,218 | Treese | Jan. 16, 1951 |
| 2,711,711 | Harman | June 28, 1955 |
| 2,763,855 | Wilfert | Sept. 18, 1956 |
| 2,885,992 | Roberts et al. | May 12, 1959 |

FOREIGN PATENTS

| 899,729 | Germany | Dec. 14, 1953 |